United States Patent [19]
Knapp et al.

[11] Patent Number: 5,454,069
[45] Date of Patent: Sep. 26, 1995

[54] PROCESS FOR CONVERTING SERIAL IMAGE TO THE STEROLITHOGRAPHY APPARATUS (SLA) SLICE FILE WITH AUTOMATIC BASE AND SUPPORT GENERATION

[75] Inventors: Charles F. Knapp; P. L. Charles Fischer; Samuel V. DuPlessis, all of Lexington, Ky.

[73] Assignee: University of Kentucky Research Foundation, Lexington, Ky.

[21] Appl. No.: 297,713

[22] Filed: Aug. 30, 1994

Related U.S. Application Data

[63] Continuation of Ser. No. 934,236, Aug. 25, 1992, abandoned.

[51] Int. Cl.$^6$ .............................. G06F 15/46; G06F 15/60
[52] U.S. Cl. ...................... 395/120; 395/141; 364/413.19
[58] Field of Search ........................ 395/120, 135, 395/139, 121, 124, 128, 129, 119; 364/413.16, 413.13, 413.14, 413.19, 413.25, 413.22, 413.18, 578, 412; 340/730; 382/56; 358/88

[56] References Cited

U.S. PATENT DOCUMENTS

| | | | |
|---|---|---|---|
| 4,523,226 | 6/1985 | Lipton et al. | 358/88 |
| 4,646,356 | 2/1987 | Anderson et al. | 382/56 |
| 4,885,688 | 12/1989 | Crawford | 364/413.22 |
| 5,099,846 | 3/1992 | Hardy | 128/653.1 |
| 5,184,306 | 2/1993 | Erdman et al. | 364/474.05 |
| 5,365,996 | 11/1994 | Crook | 164/45 |

*Primary Examiner*—Heather R. Herndon
*Assistant Examiner*—Michael Smith

[57] ABSTRACT

Method and apparatus for converting a series of serial section images of an object into a three-dimensional model. The method includes acquiring and storing the series of serial section images, converting, zooming, and interpolating serial section images. The method further includes discriminating the series of serial section images to form a binary image, which is then compressed, and filtered. Further, support data for floating or cantilevered portions of the object and base data are generated, the filtered binary image is translated to produce a plurality of vectors representing pixels of the object, and a three-dimensional model of the object is produced from the plurality of vectors representing pixels of the object, the support data, and the base data.

15 Claims, 3 Drawing Sheets

FIG. 3(a)
ORIGINAL BINARY IMAGE
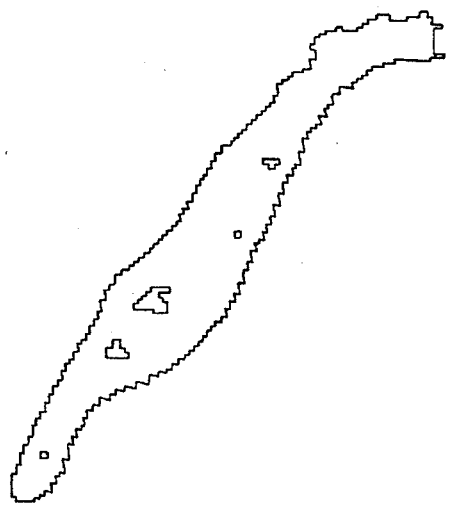
FIG. 3(b)
ZOOMED BINARY IMAGE
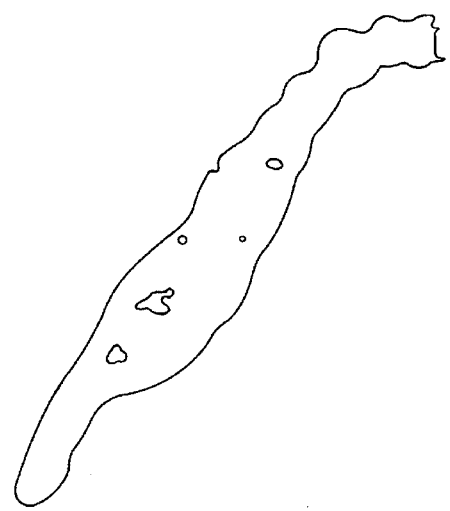
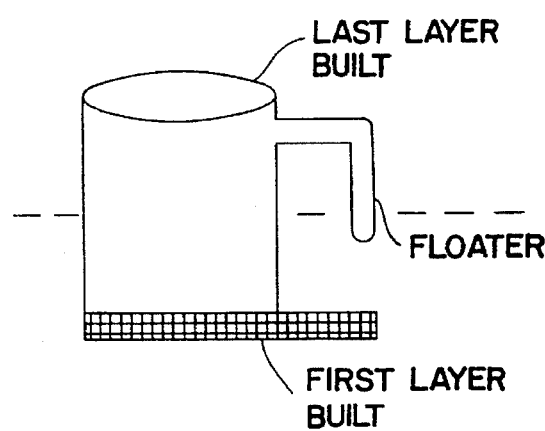
FIG. 4(a)
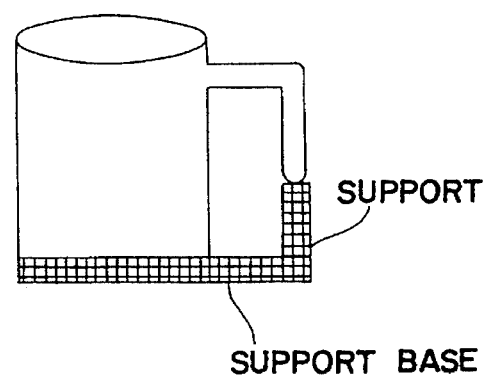
FIG. 4 (b)

BOTTOM BASE
SECTION

MIDDLE BASE
SECTION

TOP BASE
SECTION

PROCESS FOR CONVERTING SERIAL IMAGE TO THE STEROLITHOGRAPHY APPARATUS (SLA) SLICE FILE WITH AUTOMATIC BASE AND SUPPORT GENERATION

This application is a continuation of application Ser. No. 07/934,236 filed on Aug. 25, 1992, now abandoned.

FIELD OF THE INVENTION

The present invention is directed to an apparatus and method for converting a series of serial section images of an object into a physical three-dimensional model, and more particularly, to the conversion of various types of imaging modalities, such as computer-aided tomography (CT) scans or magnetic resonance imaging (MRI) scans, into a physical three-dimensional model, produced by a three-dimensional modelling device such as a stereolithography apparatus (SLA).

BACKGROUND OF THE PRESENT INVENTION

Image data such as CT scans and MRI scans have been used to build three-dimensional displays, and three-dimensional models in order to assist physicians prior to surgery. A series of serial section images are correlated to build the three-dimensional display or the three-dimensional model. The conventional process for generating such a display or model consists of providing the data points which make up the series of serial section images to a CAD/CAM system, whereby an operator at the CAD/CAM system, reviews all the data points present in the series and determines which ones are necessary to generate the desired display or model. The operator disposes of the data points which are not on the boundary of the object of interest or which are redundant to defining the geometry of the object. A routine serial section study consists of 40 images with each image made up of 512×512 voxels. The number of data points present in a series of serial section images is greater than 10,000,000 and these 10,000,000 data points are displayed on a three-dimensional display screen. It is incumbent upon the operator to select the correct data points which define the geometry of the object in question by selecting some of the data points and connecting them in three-dimensional space. This process requires intensive interaction with the set of data points, and is a tedious and inaccurate process which may take weeks to complete. The present application, however, solves this problem by providing an apparatus and method for automatically translating the graphic information of the original series of serial section images into vector data wherein the unnecessary vector data is filtered out, and the necessary vector data is correctly correlated so as to build the three-dimensional geometrical model of the object of interest.

OBJECTS OF THE PRESENT INVENTION

It is an object of the present invention to accurately and efficiently generate a three-dimensional model from a series of serial section images by automatically converting a graphic representation of the serial section images into filtered vector data.

It is another object to provide the resulting filtered vector data to a stereolithography apparatus (SLA) to generate a three-dimensional physical solid model.

It is still another object of the present invention to utilize computer-aided tomography (CT) scans as the serial section image input.

It is still another object of the present invention to utilize magnetic resonance imaging (MRI) scans as the serial section image input.

It is still another object of the present invention to utilize microtome slices as the serial section image input.

It is still another object of the present invention to utilize ultra sound images as the serial section image input.

SUMMARY OF THE PRESENT INVENTION

The above-mentioned objects of the present invention are accomplished by virtue of a novel apparatus and method for converting a series of serial section images into a physical three-dimensional model. The series of serial section images are acquired and stored, then converted into a predetermined format, zoomed, and additional serial section images are interpolated between each of the zoomed series of serial section images. Further, the entire set of serial section images is discriminated by retaining all pixels greater than or equal to a predetermined threshold to form a binary image. The binary image is then compressed and filtered by retaining all contiguous groups of pixels with a pixel area greater than a predetermined area. Next, support data for floating or cantilevered portions of the object and base data are generated. Finally, the filtered binary image is translated to produce a plurality of vectors representing pixels of the object and a three-dimensional model of the object is produced from the plurality of vectors representing pixel of the object, the support data, and the base data.

BRIEF DESCRIPTION OF THE DRAWINGS

The embodiments of the present invention are illustrated in the attached drawings where:

FIGS. 3(a) and (b) is a diagram which illustrates the difference between an original binary image and a zoomed binary image.

FIGS. 4(a) and 4(b) are diagrams of a support generated for a coffee mug handle.

DETAILED DESCRIPTION OF THE PREFERRED EMBODIMENTS

An understanding of the present invention may be more easily had by reference to a preferred embodiment. Two-dimensional serial section images are obtained through computer aided tomography imaging or magnetic resonance imaging. From these images, features of interest are extracted and then converted to vectors, from which a quantitative three-dimensional electronic solid model is generated. The use of this electronic solid model is four-fold:

1) left in its electronic form, it can be used as a visual aid in presurgical planning, 2) it can be used as a data base to drive a stereolithography apparatus (SLA), thus, creating a three-dimensional physical model, 3) it can serve as a quantitative anatomical shape from which an implant can be designed and analyzed, and 4) it can be used as a data base to control positioning devices during surgery.

The present invention is directed to the conversion of various image modalities such as computer-aided tomography (CT) scans or magnetic resonance imaging (MRI) scans into a physical three-dimensional model, produced by a stereolithography apparatus (SLA), or other physical modelling device. The SLA produces a plastic model of the object of interest.

As discussed above, this process has immediate applications in medicine and industry. Medical applications are numerous due to the large number of imaging modalities available. These imaging techniques allow a physician to view objects and tissues non-invasively. The device and method of the present application provide a quick and accurate means to reproduce those objects as a physical model for a variety of purposes, including presurgical planning or as part of an implantation process. Further, the device and method of the present application are advantageous over conventional devices and methods in that the present invention provides direct conversion of image data to a format for the physical modelling apparatus, thus significantly reducing user interaction time and increasing cost effectiveness. Further, the device and method of the present application improve the surface quality and accuracy of the model and automatically provide support structures when needed for the physical model.

Figure 1:
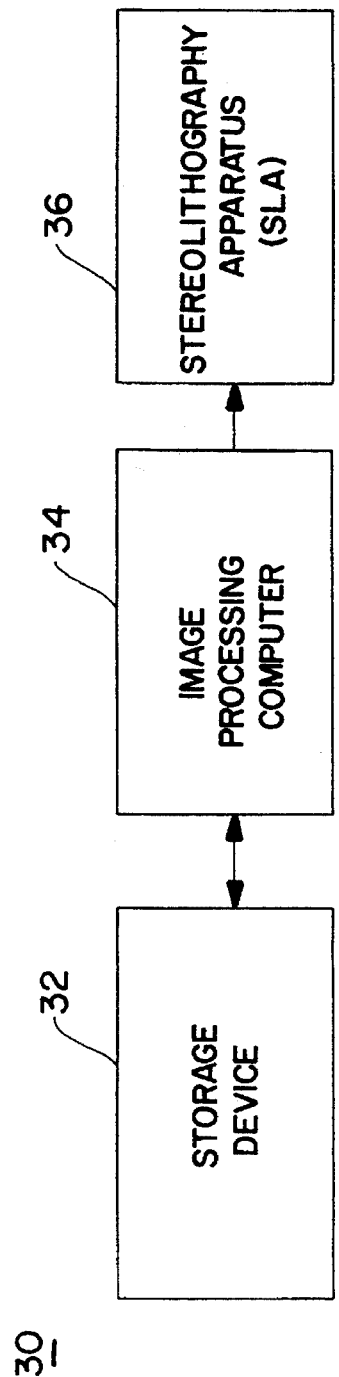
FIG. 1 is a block diagram of an apparatus of the present application.

FIG. 1 illustrates the apparatus 30 for converting a series section images of an object into a three-dimensional model includes storage media 32, such as a nine track tape recorder for receiving the series of serial section images from an imaging device. The apparatus further includes image processing computer 34 for converting, processing, and filtering the series of serial section images, as well as generating base structure information and support structure information. The converted, processed, and filtered serial section vector data, the base structure information, and the support structure information are input to a three-dimensional modeling device, such as a stereolithography apparatus (SLA) 36 in order to form the three-dimensional model.

Figure 2:
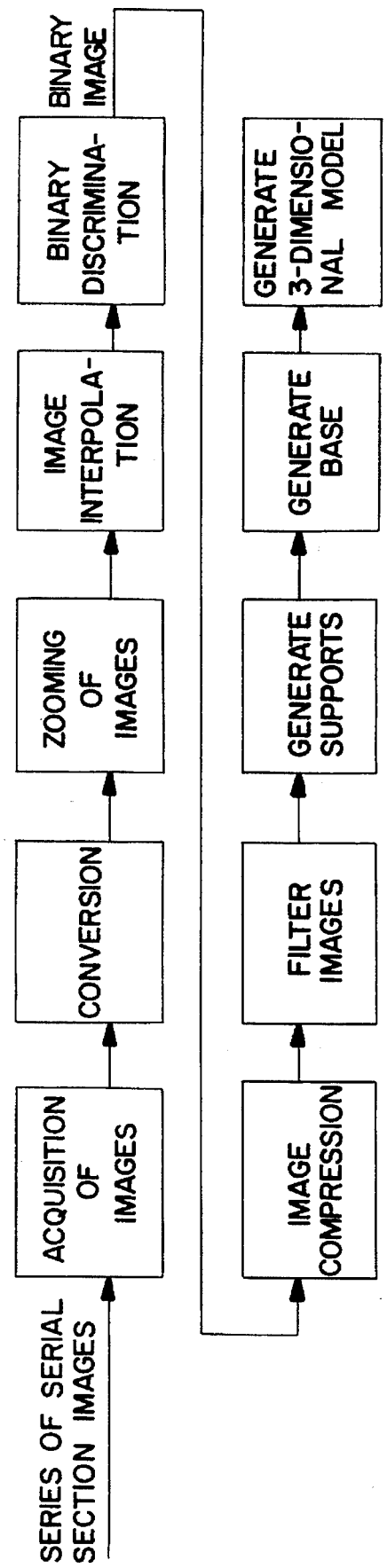
FIG. 2 is a block diagram of the method of the present application.

As shown in FIG. 2, the first step in the method performed by the above described device 30 is the acquisition of serial images of the object of interest. The method of the present application is capable of utilizing many imaging modalities, such as serial images obtained from computer-aided tomography, magnetic resonance imaging, or microtome images. Images are obtained by any one of the techniques described above which take "slices" through the object to be imaged. These slices are image representations of the cross-sections of the object at specific distances along an arbitrary axis. The serial section images can also be obtained by video imaging of thin slices taken by a standard microtome or cryromicrotome. In this latter technique, the object is sliced with a blade in very thin sections. The object is surrounded by a contrasting media (such as dark colored wax) and a high resolution video camera captures an image of each slice.

Once the serial images of the object of interest are acquired, the serial images must be converted and transferred to a usable format. The serial images are transferred from the storage device 32 to the image processing computer 34. Since most imaging systems do not store data in a standard format, the image data must be converted from the system's format to one that is usable by the image processing computer 34. In a preferred embodiment, the method of the present application utilizes a raster file including three parts, a header, a color map, and an image data portion as the format for the transfer of all image data. The header part includes:

| HEADER PART | VALUE IN THE PREFERRED EMBODIMENT |
| --- | --- |
| Image Width in Pixels | Must Be Even |
| Image Height in Pixels | No Restrictions |
| Image Depth in Bits | 8 Bits |
| Image Length | Image Width * Image Height |
| Image Type | 1 |
| Color Map Type | 1 |
| Color Map Length | 768 bytes |

The color map portion of the raster file includes 256 bytes, from 0 to 255, for the red part of the color map, 256 bytes for the green part of the color map, and 256 bytes for the blue part of the color map. Finally, the image data includes one byte per pixel with 0 equalling black and 255 equalling white, wherein the first pixel is the upper left pixel of the image. Once the images are in the correct raster format, image processing is performed on the images.

The images are then zoomed to improve resolution. The images from a typical CT scan are usually in matrix of 512 by 512 pixels. The actual spatial dimensions that each pixel represents varies with the size of the field of view of the scan. Since the pixel matrix size is fixed, the pixel represents a smaller portion of the image when the field of view is smaller, thus resolution is improved. Therefore, the smaller the object, the greater the resolution of the CT scan. The resolution also directly affects the surface of complex three-dimensional shapes. Contoured surfaces are constructed by one pixel moves and if the pixel size is decreased, the surface finish improves. In order to improve the surface finish of the model, it is essential to reduce the size that each pixel represents. Since the original pixel matrix size is fixed, the only way to reduce the size that each pixel represents is to insert pixels in the original matrix using a bilinear method.

This step in the present application is referred to as "zooming" the image. An example of an original binary image and a zoomed binary image are shown in FIGS. 3(a) and 3(b), respectively wherein the surface quality of the object being imaged is significantly improved by the zooming operation. If the original image is 512 by 512 pixels and it is zoomed to 1024 by 1024 pixels, then the pixel size is reduced by a factor of two in each direction, thereby improving the surface quality of the imaged object. The unzoomed surface is very rough due to the one pixel steps along the surface of the part. By zooming the images up to 1024 by 1024, a smoother surface finish can be obtained.

The distance which separates the original scans may vary from 1 to 10 mm on a medical CT scanner and can be controlled to a fraction of a millimeter on an industrial scanner. A typical CT scan includes of a series of images taken every 2 mm. The SLA can produce an object from sizes which vary from 0.125 mm to 0.5 mm thick. The surface finish however improves with the reduction of the thickness of the sliced layers. Since a typical CT image is taken every 2 mm, there is a large gap of missing information. In order to produce a three-dimensional model without a stair-step effect, the void in the data must be filled. A linear interpolation between the two images is used to fill the 2 mm gap between the original slices. New images are created between the original slices to help present additional layers to be grown on the SLA. If the SLA builds a model using slice layers that are 0.25 mm thick, then seven new layers need to be generated by interpolation between each of the CT images taken at a 2 mm thickness.

The grey level of each pixel of the new layers to be created is a linear function of the two original bounding images. For example, two images, image 1 and image 2, which are spaced 1 mm apart require three more images, image A, image B, and image C, to create slices every 0.25 mm. These three images will be "made up" from the information found in the original two images. Beginning with the first pixel in image A, the grey level of the first pixel in image 1 will be multiplied by 0.75 and added to the grey level of the first pixel in image 2 after it has been multiplied by 0.25. This is repeated for every pixel in the image. To find the grey level value of the first pixel of image B, the first pixel of image 1 and image 2 will be multiplied by 0.5 and added. Image C is created by adding the pixel value of image 1 times 0.25 to the pixel values of image 2 times 0.75. In this manner, the grey values of the pixels between image 1 and A, A and B, B and C, and C and 2 will vary linearly.

The next step performed in method of the present application is to discriminate the image data to form a binary image. Once interpolated images have been obtained, the method of the present application must derive necessary information from their original and interpolated images in order to provide this information to the SLA to produce the model. Therefore, the method must extract a particular part of the image from the remainder of the image. If the CT scan was taken of a human head, and the area of interest to the physician is the mandible, for example, then the other tissue present in the images, such as other bone, muscle, skin, etc. must be removed from the whole image. Images from a CT show comparable tissue represented by the same grey values. The grey values are proportional to the x-ray opaqueness of the tissue. Bone has fairly consistent grey levels throughout the entire series of images. Since bone is fairly x-ray opaque, it typically has a high grey level value on the CT image. Part of the image representing bone can be extracted by selecting a range of grey level values which encompasses the value of bone only.

As an example, suppose that the bone in the first image of a series of ten images has been found to have a grey level value of 190 (out of 255) or above. The method of the present application prompts the user for the binary discrimination grey level and in this case, the user enters 190. The grey level of each pixel of each image will be checked and if it is 190 or greater then the method of the present application will change the value to the maximum level, in this case, 255, otherwise the value will be set to 0. Now each image can be easily interpreted by other steps of the method of the present application. Pixels with the value of 255 represent bone in each layer and are the locations in space where the liquid polymer needs to be hardened by the SLA laser during the physical model building step.

Each series of images requires very large file storage space. For example, the 512 by 512 image requires 256K of memory and the 1024 by 1024 image requires 1 Meg. Since conserving file space is important, a compression step of each image is necessary once the images have been discriminated. The image files at this stage include a header and an array of bytes that represent the pixel grey level value. The compression step looks for a series of pixels with the same value and replaces the series with a number of pixels in the value. For example, suppose that the first pixel encountered in the image has a value 0 (black) followed by the next 24 pixels that are also 0. In this case the compression step would output to the compressed file the values 25,0. The compression step would then continue with the 26th pixel which, for example, has a value of 255 (white) and continue checking each pixel until a non-white (not 255) pixel value is encountered. As before, the compression step would write the number of white pixels and the value. This operation is repeated until the entire image file is written. Binary image files compress extremely well since they are composed of a series of only black or white pixel values. The typical compression ratio is approximately 100 to 1.

The next step in the method of the present application is to filter each image. The binary discrimination step automatically selects all parts of a series of images 12 a specific grey level range. However, the result of this discrimination is not ready for physical object processing. Typically there will be very small bits of noise present in the binary image that must be taken out to simplify the conversion in order to produce the three-dimensional model. This noise is a result of very small unwanted parts of the image, usually only several pixels, that fall in the range of the discriminating grey level value. Each binary image includes groups of pixels of like value. The contiguous groups of pixels with the value of 255 are found and identified by the method of the present application as an "object". An object can be any shape as long as all pixels in the group are touching at least one other pixel in the group. Large objects are generally those that are to be produced as the physical model by the SLA. Very small objects need to be removed from each image. The method of the present application identifies each object in the image and then finds the area of the object. The area of the object is simply the number of pixels which make up the object. If the particular object's area falls below a predetermined area, then it is considered unwanted and the pixel grey level values are changed to 0, i.e. the object is removed from the image. The predetermined area for small object removal changes with the zoom factor. If the series of images is zoomed from 512 by 512 pixels to 1024 by 1024 pixels, then the predetermined area is multiplied by a factor of four.

Once the small objects are removed from each image then a median filter is used to smooth the image edges of the object. The median filter ranks the pixels in a two dimensional matrix, where both dimensions are of odd size. The center pixel in the matrix is replaced with the middle value of the ranked pixels. After the small objects are removed and the image filtered, the image is written to disk.

The next step in the method of the present application is the generation of supporting structures which will be required by the SLA during fabrication of the physical model. The SLA system, by the nature of its operation, will not be able to build objects unless they have underlying support which extends to the "build platform" of the SLA. The SLA builds objects one layer at a time from the bottom to the top with the bottom layers "grown" on a break away grid attached to the build platform. Each subsequent layer depends on the previous layers for support in the vat of liquid resin. There are many examples where the object to be built on the SLA is not supported from below, but from a structure on top of the object.

As shown in FIGS. 4(a) and 4(b), the handle of a coffee mug is one example. Since the upper portion of the handle will be built last, the lower, unsupported part of the handle will "float away" because it will not be attached to the main part of the mug at this time in the fabrication process. These "floaters" must be supported in order to build the part. Another similar problem arises due to large cantilevered objects. These objects are supported at one end and are so large that they tend to sag at the other, unsupported end. Such objects also require support.

In order to automatically create the supports for floaters and cantilevered objects, each image must be compared to the one directly under it. This comparison finds the objects in each image that are unsupported or cantilevered. In order to simplify the process, all images are broken into groups of 0.25 inch cells. The step begins by comparing the last image, i.e., the top image in SLA space to the second to last image. Each cell in the top image will be checked for objects. The identified objects will be compared to the corresponding cell in the lower image. If the objects in the upper cell are not consistent with the objects in the lower cell, i.e., an object in the upper cell does not have an object directly below it, a support will be generated in the lower image. The center of the support is located at the coordinates of the centroid of the object in the upper image. The support includes a thin cross. This means of supporting objects will work for multiple objects in each cell or if the cell is completely filled with one object. In the case of cantilevered objects, usually the entire upper cell will be one object but the lower cell will have no objects to provide support. As discussed above, a support will be generated to prevent sagging. Cantilevered objects have a support generated every 0.25 inch.

The above example shows how support, if needed, is generated in the second to last layer. The process is continued with each layer until the last layer is reached. If a floater is found in the last layer, a support will be generated in each subsequent layer until the bottom of the series of images is reached or until the support extends to another object below it. As the support gets longer, the cross-section is made broader to provide more column strength. The support is very small, on the order of 0.1 inches, at the beginning, but gets wider as it extends down. The strength of the support is critical since a very long support has a tendency to sway if it is not strong enough.

The next step in the method of the present application is to build the base structure upon which the part will rest. The purpose of the base is to make the object grown by the SLA easy to remove from the build platform. As the images are being checked for floaters and supports, the maximum and minimum X and Y coordinate values of all the objects in the particular image are stored. These numbers are compared to the values in the following images and the greatest number is kept. At the end of this "defloat" phase, the method of the present application will take the maximum and minimum X and Y values and create a base with the appropriate X and Y dimensions.

Figure 5A:
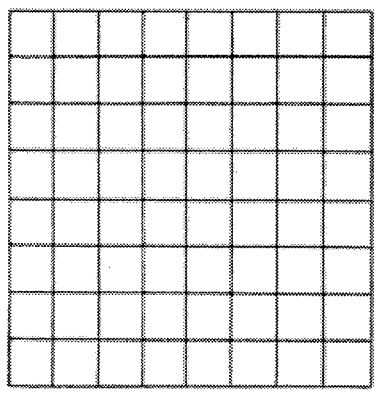
FIGS. 5(a), 5(b) and 5(c) are diagrams of the bottom base section, middle base section, and top base section for the physical model.
Figure 5B:
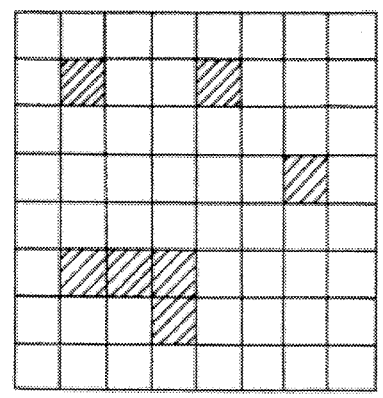
Figure 5C:
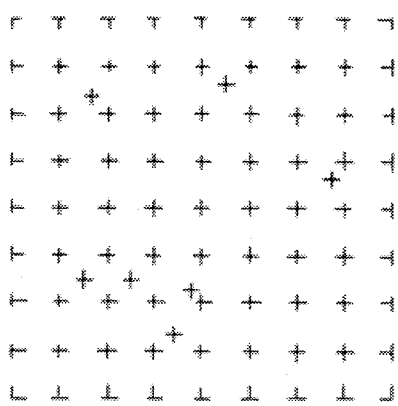

The base is made of three sections each with a specific function. The first section, the bottom base section, is attached to the build platform of the SLA. This section is composed of very thin-walled cells. The walls of the cells are just one laser pass wide, about 0.020 inches. The thin-walled structure provides enough support, and can be easily broken when the object is removed. The bottom base section of the base is 0.25 inches tall and is shown in FIG. 5(a). The middle section of the base is a 0.25 mm addition to the first section, plus a fill pattern in each cell that has a support which extends down from the object above, as shown in FIG. 5(b). Only the cells which need a place for attachment of the support are filled. In this manner, the base will be mostly open and allow for sufficient drainage of the liquid resin. The top section of the base is a simple cross pattern at the corner of each cell, and at each support. This arrangement, as shown in FIG. 5(c), also allows for drainage of the liquid resin. The cross pattern will extend up until the base is 0.33 inches tall. The actual object starts at approximately 0.28 inches above the build platform. As a result, there is a 0.050 inch overlap between the base and the object which provides a positive attachment of the object to the base.

The final step in the method of the present application is translating the image data to the SLA slice file format. In order to generate a three-dimensional object, the data required to drive the data and the SLA are extracted from each image. The SLA has many types of vectors which it can trace with the laser. Each vector is specific to the geometry of the object to be created. It is necessary to obtain pixel location information for each vector. The location information is then converted to calibrated X and Y coordinate moves within the SLA coordinate system. The first vectors of interest are the X and Y cross hatch vectors. These vectors provide a fill pattern for the internal structure of the part. To generate the X cross-hatching, which starts at the upper left and moves to the lower right, each pixel of the image is compared to 0. If the value is not 0, a vector is started. This vector continues until a pixel with grey value 0 is found. Once a pixel with the grey value of 0 is found, the end of the vector is defined one pixel to the left of the current location. Once the vector is ended, a new vector is started by looking for a new object. If the right side of the image is found while looking for the end of the object, the end of the vector is at the edge. This procedure is repeated for each row of pixels and then continued for cross hatching in the Y direction.

The other important vectors to be generated are a layer of border vectors which outline the object. The layer of border vectors give the object a smooth exterior and provide a seal around the edges of the interior. The layer of border vectors are created by finding the contours of the object by tracing around the object point by point. To generate the layer of border vectors, first a contour image must be generated. The contour image includes only white pixels with at least one black pixel above, below, to the left of, or to the right of the white pixel. Next, a starting pixel is defined as the top left pixel of the object. Finally, a left-hand trace is utilized to follow the contour image, writing each pixel pair as a vector. Each pixel is set to black after tracing to prevent a second pass over the same area.

After all of the data point vectors for each layer have been generated and written to an SLA file, the object is ready to be built, in accordance with the description provided in U.S. Pat. No. 4,929,402 to Hull, which is hereby incorporated by reference. The SLA slice file can be taken to any SLA machine and grown. The source code of the software program which performs the method of the present application is included as appendix A.

Figure 6:
FIG. 6 is paragraph of a stereolithographic model of the skull of a swine in which a "T" shaped defect was cut before CAT scanning.

For purposes of an example, it was of interest to determine the accuracy of the process by making measurements of a defect in the skull of a swine and comparing the dimensions of the defect with those from a stereolithographic model of the skull. To determine the accuracy, a "T" shaped defect was machined into a swine skull after the skin was folded back (see FIG. 6). The skin was then returned to its original position and contiguous axial slices of two millimeters were imaged using CT.

A model file was generated and processed by a stereolithography apparatus for the above-described object. The model took approximately 20 hours to "grow" from the time the system was started. Careful measurements of the skull and model defect were made after the model was cleaned. The skull defect measured 22.97 mm by 22.91 mm and the model defect measured 23.40 mm by 23.00 mm for a maximum difference of 0.43 mm (or 1.9%).

From the above-mentioned description, it is apparent that the disclosed process and apparatus for converting serial images to the stereolithograph apparatus SLA slice file with automatic base generation exhibits significant advantages over the existing conventional systems. From the above-mentioned advantages and the attendant descriptions of the preferred embodiments, it is apparent that this system significantly improves three-dimensional model generation. While the preferred embodiments are directed to a stereolithography apparatus, the teachings of the present invention are equally applicable to other apparatus for generating a three-dimensional models and other forms of imaging, as would readily occur to one of ordinary skill in the art. Indeed, the teachings of the present application can be extended as would occur to one of ordinary skill in the art and various modifications to the techniques described in the present application are contemplated by the Inventors and are within the scope of the present application as defined in the appended claims. Of course, the scope of the present application is to be determined solely by the scope of the appended claims.

```c
struct   stat_t
(
    unsigned               st_dev;
    unsigned short         st_ino[3];
    unsigned short         st_mode;
    int                    st_nlink;
    unsigned               st_uid;
    unsigned short         st_gid;
    char                   *st_rdev;
    unsigned               st_size;
    unsigned               st_atime;
    unsigned               st_mtime;
    unsigned               st_ctime;
    char                   st_fab_rfm;
    char                   st_fab_rat;
    char                   st_fab_fsz;
    unsigned               st_fab_mrs;
};
#define TRUE     (1)
#define FALSE    (0)
#include <stdio.h>
#include <string.h>
#include <unistd.h>
#include <sys/file.h>
#include <malloc.h>
#include "/usr/imco/include/miap/cipldef.h"
#include "/usr/imco/include/miap/mpdef.h"
#include "/usr/imco/include/miap/rtv.h"
#include "/usr/imco/include/miap/grtyp.h"
#include <math.h>
#include "/home/fischer/jun/ecc.h"

extern struct vmb_dir *actvmb;    /* ptr to struct to get mem size */
extern struct seq *sequ;          /* ptr to frame layout */ struct seq *sequ;

define ACTU    2
define NPTS    244 main()
(
        extern  int             act_unit;
        char                    image_in[16], image_out[16], image_aux[16];
        char                    image_temp[16], image_grid[16], temp_str[8];
        char                    file_name[133], base_name[133], in_name[133];
        FILE                    *fp;
        unsigned short int      nimx,nimy,nimxy,xbas,ybas,addrbuf[2048];
        unsigned long int       sizex,sizey,err;
        int                     first, last, spacing, i, k, points, x, y;
        char                    answer[133], temp_char;
        short int               temp_short;
        unsigned short int      lut[768];
        int                     fileid, fileid2;
```

```
            int                 small;
            long int            temp_long;
            unsigned long int   error;
            unsigned char       *image, tt[256];
            float               fov_x, fov_y, thickness;
            int                 support_x, support_y, istart, iend;
            int                 start[2], finish[2];
            int                 max_x, min_x, max_y, min_y;
            int                 status;
            OBJ_FEAT            features;
            double              val;

/* Kontron stuff */
    short int       x0;             /* start x address of vmb      */
    short int       y0;             /* start y address of vmb      */
    short int       wx;             /* x width of vmb              */
    short int       wy;             /* y width of vmb              */

/* ECC stuff */
        struct ecc_file_header   file_hd;
        struct ecc_images        images;

tt[0] = 0;
        for (i = 1; i < 256; i++) tt[i] = 255;

printf ("initialize miap  ");
        if (initib() == 0) printf("ok\n");
        else
        {
            printf("It needs work.\n");
            exit(-1);
        }

/* Set the image names to use */
        printf ("Enter base file name: ");
        scanf ("%s", base_name);

in_name[0] = 0;
        strcat (in_name, base_name);
        strcat (in_name, ".data");
        fp = fopen(in_name, "rb");
        fread (&first, sizeof(int), 1, fp);
        fread (&last, sizeof(int), 1, fp);
        fread (&spacing, sizeof(int), 1, fp);
        fread (&fov_x, sizeof(float), 1, fp);
        fread (&fov_y, sizeof(float), 1, fp);
        fread (&thickness, sizeof(float), 1, fp);
        fclose(fp);
        first = (first - 1) * spacing + 1;
        last = (last - 1) * spacing + 1;

printf ("First image number is %d\n", first);
        printf ("Last image number is %d\n", last);

itoa(first, image_in);
        in_name[0] = 0;
```

```
strcat (in_name, base_name);
strcat (in_name, "_b.");
strcat (in_name, image_in);
fp = fopen(in_name, "rb");
fread(temp_str, 1, 8, fp);
if (strcmp(temp_str, "W-G_BIN") != 0)
{
    printf("Not a Wenner-Gren binary file\n");
    exit(-1);
}
fread(&sizex, sizeof(long int), 1, fp);
fread(&sizey, sizeof(long int), 1, fp);
fclose(fp);

support_x = 0.03 / (fov_x / sizex) + 1;
support_y = 0.03 / (fov_y / sizey) + 1;
printf ("Support size is: %d by %d\n", support_x, support_y);

ecc_init(2);
images.image_bits = 8;
images.overlay_bits = 0;
images.x_image_size = sizex;
images.y_image_size = sizey;
images.num_images = 1;
images.x_pixel_size = fov_x / sizex;
images.y_pixel_size = fov_y / sizey;
images.thickness = thickness;
images.addres_mode_x = 1;
images.addres_mode_y = 1;
images.addres_mode_z = 1;
ecc_set_images(&images);
image = (unsigned char*)ecc_find_image(&images, 0, &error);

printf (" X image size: %d\n", sizex);
printf (" Y image size: %d\n", sizey);

x0 = actvmb->memx0;
y0 = actvmb->memy0;
wx = actvmb->memwx;
wy = actvmb->memwy;
err = INISEQ(x0,y0,wx,wy,sizex,sizey,sequ);
IMDEL("1");                              /* to get around */
IMSET("1",0,0,sizex,sizey,0);            /* a iniseq bug */
nimx = sequ->seq_nimx;
nimy = sequ->seq_nimy;
nimxy = sequ->seq_nxy;

printf ("Error= %d\n",err);
printf ("Number of images in X=%d\n",nimx);
printf ("Number of images in Y=%d\n",nimy);
printf ("Number of images=%d\n",nimxy);

/* load lookup table */
  printf ("loading lookup table 4\n");
  rdlut("/usr/imco/miap/colordef.004");
                              /* make a grid mask image
```

```
        DISPLAY("10");
        CLFRAM("10", 3, 255);
        IMFRAM("10", "10", "10");
        WRCTRL();
        MODEGR(1, 0, 1);
        MODEGR(4, 0, 1);
        k = sizey / fov_y * 0.25;
printf("k = %d, fov_x = %f, sizey = %d\n", k, fov_x, sizey);
        for (i = 0; i < sizey; i += k)
        {
            start[0] = 0;
            start[1] = i;
            finish[0] = sizex - 1;
            finish[1] = i;
            VECTGR(start, finish, 1);
        }
        k = sizex /fov_x * 0.25;
        for (i = 0; i < sizex; i += k)
        {
            start[0] = i;
            start[1] = 0;
            finish[0] = i;
            finish[1] = sizey - 1;
            VECTGR(start, finish, 1);
        }

DISPLAY("1");
        itoa(last, image_in);
        in_name[0] = 0;
        strcat (in_name, base_name);
        strcat (in_name, "_b.");
        strcat (in_name, image_in);
        printf("Copy file %s to Kontron image %s\n", in_name, "1");
        fp = fopen(in_name, "rb");
        expand(fp, image, &sizex, &sizey);
        fclose(fp);
        ecc_display(&images, 0);
        imageout("1", image);
        RANKOP("1", "3", 3, 5);
        IDENTIM("3", "4", 3);
        small = 12;                              /* set object size */
        SELOBA("4", "3", 0, 0, small);
        DISCR("3", "4", tt);
        COPYFR("4", "9", 3);
        imagein("4", image);
        in_name[0] = 0;
        strcat (in_name, base_name);
        strcat (in_name, "_wb.");
        strcat (in_name, image_in);
        fp = fopen(in_name, "wb");
        compress(image, fp, sizex, sizey);
        DISPLAY("8");

/* smooth and defloat images */
        for (i = last; i > first; i--)
```

```
{
    itoa(i - 1, image_in);
    in_name[0] = 0;
    strcat (in_name, base_name);
    strcat (in_name, "_b.");
    strcat (in_name, image_in);
    printf("Copy file %s to Kontron image %s\n", in_name, "2");
    fp = fopen(in_name, "rb");                    /* read image */
    expand(fp, image, &sizex, &sizey);
    fclose(fp);
    imageout("2", image);
    RANKOP("2", "5", 3, 5);                       /* slight smooth of image */
    IDENTIM("5", "6", 3);
    SELOBA("6", "7", 0, 0, small);                /* remove small objects */
    DISCR("7", "6", tt);
    BOOLOP("6", "9", "9", 0, 1);
    imagein("6", image);
    ecc_display(&images, 0);
    BOOLOP("4", "11", "10", 0, 2);                /* grid the image       */
    DISPLAY("11");
    IDENTIM("11", "7", 3);
    SELOBB("7", "8", "6", 0);                     /* find floaters        */
    RESET_EXTRAC(features);
    SET_FEAT(features, F_CMS_X);
    SET_FEAT(features, F_CMS_Y);
    status=1;
    val = -1.0;
    do
    {
        extrac("8",features,1.0,1.0,1,TRUE,&status,NULL,NULL);
        if (!status)
        {
            GET_FEAT(features,F_CMS_X,val);
            x = val;
            GET_FEAT(features,F_CMS_Y,val);
            y = sizey - val - 1;
            istart = x - support_x;
            if (istart < 0) istart = 0;
            istart = y * sizex + istart;
            iend = x + support_x;
            if (iend >= sizex) iend = sizex - 1;
            iend = y * sizex + iend;
            for (k = istart; k <= iend; k++) image[k] = 254;
            istart = y - support_y;
            if (istart < 0) istart = 0;
            istart = x + istart * sizex;
            iend = y + support_y;
            if (iend >= sizey) iend = sizey - 1;
            iend = x + iend * sizex;
            for (k = istart; k <= iend; k = k + sizex)
            {
                image[k] = 254;
            }
        }
    }
    while(status == 0);
```

```
        in_name[0] = 0;
        strcat(in_name, base_name);
        strcat(in_name, "_wb.");
        strcat(in_name, image_in);
        fp = fopen(in_name, "wb");
        compress(image, fp, sizex, sizey);
        fclose(fp);
        imageout("4", image);
}

/* build the 4 base frames */
printf("Build the base frames.\n");
BOOLOP("9", "9", "4", 0, 1);
imagein("9", image);
DISPLAY("1");
CLFRAM("1", 3, 0);
IMFRAM("1", "1", "1");
WRCTRL();
MODEGR(1, 255, 1);
MODEGR(4, 255, 1);
support_x = 0.2 / (fov_x / sizex) + 1;
support_y = 0.2 / (fov_y / sizey) + 1;
max_x = 0;
min_x = sizex - 1;
max_y = 0;
min_y = sizey - 1;
for (i = 0; i < sizex * sizey; i++)
{
    if (image[i] != 0)
    {
        y = i / sizex;
        x = i - sizex * y;
        if (x > max_x) max_x = x;
        if (y > max_y) max_y = y;
        if (x < min_x) min_x = x;
        if (y < min_y) min_y = y;
    }
}
printf("%d, %d to %d, %d\n", min_x, min_y, max_x, max_y);
start[0] = min_x;
start[1] = min_y;
finish[0] = max_x;
finish[1] = min_y;
VECTGR(start, finish, 1);
start[0] = min_x;
start[1] = max_y;
finish[0] = max_x;
finish[1] = max_y;
VECTGR(start, finish, 1);
start[0] = min_x;
start[1] = min_y;
finish[0] = min_x;
finish[1] = max_y;
VECTGR(start, finish, 1);
start[0] = max_x;
start[1] = min_y;
```

```
        finish[0] = max_x;
        finish[1] = max_y;
        VECTGR(start, finish, 1);
        for (x = min_x; x <= max_x; x = x + support_x)
        {
            start[0] = x;
            start[1] = min_y;
            finish[0] = x;
            finish[1] = max_y;
            VECTGR(start, finish, 1);
        }
        for (y = min_y; y <= max_y; y = y + support_y)
        {
            start[0] = min_x;
            start[1] = y;
            finish[0] = max_x;
            finish[1] = y;
            VECTGR(start, finish, 1);
        }
imagein("1", image);
ecc_display(&images, 0);
printf("base 1\n");
        AFILL("1", "2");
imagein("2", image);
ecc_display(&images, 0);
printf("base 2 \n");
        CLFRAM("5", 3, 0);
        IMFRAM("5", "5", "5");
        WRCTRL();
        for (y = min_y; y <= max_y; y = y + support_y)
        {
            start[0] = min_x;
            finish[0] = min_x;
            start[1] = y - support_y / 4;
            if (start[1] < min_y) start[1] = min_y;
            finish[1] = y + support_y / 4;
            if (finish[1] > max_y) finish[1] = max_y;
            VECTGR(start, finish, 1);
            start[0] = max_x;
            finish[0] = max_x;
            VECTGR(start, finish, 1);
        }
        for (x = min_x; x <= max_x; x = x + support_x)
        {
            start[1] = min_y;
            finish[1] = min_y;
            start[0] = x - support_x / 4;
            if (start[0] < min_x) start[0] = min_x;
            finish[0] = x + support_x / 4;
            if (finish[0] > max_x) finish[0] = max_x;
            VECTGR(start, finish, 1);
            start[1] = max_y;
            finish[1] = max_y;
            VECTGR(start, finish, 1);
        }
        for (y = min_y; y <= max_y; y = y + support_y)
```

```
            {
                start[1] = y;
                finish[1] = y;
                for (x = min_x; x <= max_x; x = x + support_x)
                {
                    start[0] = x - support_x / 4;
                    if (start[0] < min_x) start[0] = min_x;
                    finish[0] = x + support_x / 4;
                    if (finish[0] > max_x) finish[0] = max_x;
                    VECTGR(start, finish, 1);
                }
            }
            for (y = min_y; y <= max_y; y = y + support_y)
            {
                start[1] = y - support_y / 4;
                if (start[1] < min_y) start[1] = min_y;
                finish[1] = y + support_y / 4;
                if (finish[1] > max_y) finish[1] = max_y;
                for (x = min_x; x <= max_x; x = x + support_x)
                {
                    start[0] = x;
                    finish[0] = x;
                    VECTGR(start, finish, 1);
                }
            }
imagein("5", image);
ecc_display(&images, 0);
printf("base 3\n");

imagein("1", image);
            in_name[0] = 0;
            strcat(in_name, base_name);
            strcat(in_name, "_base.1");
            fp = fopen(in_name, "wb");
            compress(image, fp, sizex, sizey);
            IDENTIM("4", "3", 3);
            SELOBB("3", "6", "1", 0);
            DISCR("6", "6", tt);
            for (i = 0; i < 256; i++) tt[i] = 0;
            tt[254] = 255;
            DISCR("4", "3", tt);
            BOOLOP("6", "6", "3", 0, 1);
            BOOLOP("6", "7", "1", 0, 1);
imagein("7", image);
ecc_display(&images, 0);
printf("base 4\n");
            BOOLOP("6", "8", "5", 0, 1);
imagein("8", image);
ecc_display(&images, 0);
printf("base 5\n");

BOOLOP("1", "5", "2", 0, 3);           /* cut lines in filled image
            BOOLOP("5", "6", "8", 0, 2);           /* get parts to fill
            IDENTIM("5", "9", 3);                  /* ident parts of filled image
            SELOBB("9", "2", "6", 1);              /* keep need filled parts
            for (i = 1; i < 256; i++) tt[i] = 255;
```

```
    tt[0] = 0;
    DISCR("2", "2", tt);
    BOOLOP("2", "2", "1", 0, 1);

imagein("2", image);
    in_name[0] = 0;
    strcat(in_name, base_name);
    strcat(in_name, "_base.2");
    fp = fopen(in_name, "wb");
    compress(image, fp, sizex, sizey);
    imagein("8", image);
    in_name[0] = 0;
    strcat(in_name, base_name);
    strcat(in_name, "_base.3");
    fp = fopen(in_name, "wb");
    compress(image, fp, sizex, sizey);
    imagein("7", image);
    in_name[0] = 0;
    strcat(in_name, base_name);
    strcat(in_name, "_base.4");
    fp = fopen(in_name, "wb");
    compress(image, fp, sizex, sizey);

/* release miap */
    printf ("Release the MIAP.\n");
    closemiap();
}
```

```
#define TRUE     (1)
#define FALSE    (0)
#include <stdio.h>
#include <unistd.h>
#include <sys/file.h>
#include <malloc.h>
#include <math.h>
#include "ecc.h"

main()
{
        char                    image_in[16], image_out[16], image_aux[16];
        char                    image_temp[16],yes_no[10], temp_str[8];
        char                    file_name[133], base_name[133], in_name[133];
        FILE                    *fp, *fpt, *base, *sup;
        int                     hatch_x, hatch_y, spacing;
        float                   fov_x, fov_y, thickness, temp_float;
        unsigned short int      nimx,nimy,nimxy,xbas,ybas,addrbuf[2048];
        unsigned long int       sizex,sizey,err;
        int                     first, last, i, points;
        char                    draw, answer[133], temp_char;
        short int               temp_short;
        unsigned short int      lut[768];
        int                     fileid;
        long int                temp_long;
        float                   scalex, scaley;
        int                     layer_thick, layer_num;
        unsigned long int       error;
        unsigned char           *image, *image_1;
        char                    mirror,trac;

/* ECC stuff */
        struct ecc_file_header   file_hd;
        struct ecc_images        images;

ecc_init(2);

printf ("Enter base file name: ");
        scanf ("%s", base_name);
        file_name[0] = 0;
        strcat(file_name, base_name);
        strcat(file_name, ".data");
        fp = fopen(file_name, "rb");
        fread(&first, sizeof(int), 1, fp);
        fread(&last, sizeof(int), 1, fp);
        fread(&spacing, sizeof(int), 1, fp);
        fread(&fov_x, sizeof(float), 1, fp);
        fread(&fov_y, sizeof(float), 1, fp);
        fread(&thickness, sizeof(float), 1, fp);
        fclose(fp);
        first = (first - 1) * spacing + 1;
        last = (last - 1) * spacing + 1;
        thickness = thickness / spacing;
        file_name[0] = 0;
```

```
strcat(file_name, base_name);
strcat(file_name, "_wb.");
sprintf(image_in, "%d", first);
strcat(file_name, image_in);
fp = fopen(file_name, "rb");
fread(temp_str, 1, 8, fp);
if (strcmp(temp_str, "W-G_BIN") != 0)
{
    printf("Not a Wenner-Gren binary file\n");
    exit(-1);
}
fread(&sizex, sizeof(long int), 1, fp);
fread(&sizey, sizeof(long int), 1, fp);
fclose(fp);
scalex = fov_x / sizex * 5000.0;
scaley = fov_y / sizey * 5000.0;
printf ("Scale factor X in inches: %f\n", fov_x / sizex);
printf ("Scale factor Y in inches: %f\n", fov_y / sizey);
printf ("Slice thickness in inches: %f\n", thickness);
printf ("Enter hatch factor in inches: ");
scanf ("%f", &temp_float);
hatch_x = temp_float / (fov_x / sizex);
if (hatch_x < 1) hatch_x = 1;
hatch_y = temp_float / (fov_y / sizey);
if (hatch_y < 1) hatch_y = 1;
printf("Hatch distance in pixels: %d, %d\n", hatch_x, hatch_y);
layer_thick = thickness * 5000.0 + 0.5;
layer_num = 0;
                                        /* prompt for mirror image or not */
printf("Do you want to produce the mirror object? (y/n) ");
scanf ("%s", yes_no);
if((yes_no[0] == 'y') || (yes_no[0] == 'Y')) mirror = TRUE;
else mirror = FALSE;
                                        /* prompt for tracing images or not */
printf("Do you want to trace the object? (y/n) ");
scanf ("%s", yes_no);
if((yes_no[0] == 'y') || (yes_no[0] == 'Y')) trac = TRUE;
else trac = FALSE;
file_name[0] = 0;
strcat(file_name, base_name);
strcat(file_name, ".sli");
printf ("Output file name: %s\n", file_name);
fp = fopen(file_name, "wb");
file_name[0] = 0;
strcat(file_name, base_name);
strcat(file_name, "_b.sli");
base = fopen(file_name, "wb");
file_name[0] = 0;
strcat(file_name, base_name);
strcat(file_name, "_s.sli");
sup = fopen(file_name, "wb");

images.image_bits = 8;
images.overlay_bits = 0;
images.x_image_size = sizex;
images.y_image_size = sizey;
```

```c
images.num_images = 2;
images.x_pixel_size = fov_x / sizex;
images.y_pixel_size = fov_y / sizey;
images.thickness = thickness;
images.addres_mode_x = 1;
images.addres_mode_y = 1;
images.addres_mode_z = 1;
ecc_set_images(&images);
image = (unsigned char*)ecc_find_image(&images, 0, &error);
image_1 = (unsigned char*)ecc_find_image(&images, 1, &error);

printf (" X image size: %d\n", sizex);
printf (" Y image size: %d\n", sizey);

fprintf(fp, "!Wenner-Gren Lab Images to SLI Slice File\n");
fprintf(fp, "!SLICE= -VER 0.01 -RES 5000.000000 -HX 250 -HY 0 -HFX 15 -HFY
fprintf(fp, " -HA 250 -MSA 50 -MIA 0 -SCL 1.0000 -ZS %d\n\032", layer_thick
fprintf(fp, "\001\002\001\002\003\004");
temp_short = 0;
fwrite(&temp_short, sizeof(short int), 1, fp);
fprintf(base, "!Wenner-Gren Lab Images to SLI Slice File\n");
fprintf(base, "!SLICE= -VER 0.01 -RES 5000.000000 -HX 250 -HY 0 -HFX 15 -HF
fprintf(base, " -HA 250 -MSA 50 -MIA 0 -SCL 1.0000 -ZS %d\n\032", layer_th
fprintf(base, "\001\002\001\002\003\004");
temp_short = 0;
fwrite(&temp_short, sizeof(short int), 1, base);
fprintf(sup, "!Wenner-Gren Lab Images to SLI Slice File\n");
fprintf(sup, "!SLICE= -VER 0.01 -RES 5000.000000 -HX 250 -HY 0 -HFX 15 -HFY
fprintf(sup, " -HA 250 -MSA 50 -MIA 0 -SCL 1.0000 -ZS %d\n\032", layer_thic
fprintf(sup, "\001\002\001\002\003\004");
temp_short = 0;
fwrite(&temp_short, sizeof(short int), 1, sup);

itoa(2, image_aux);
itoa(3, image_out);
itoa(4, image_temp);

itoa(1, image_in);
in_name[0] = 0;
strcat (in_name, base_name);
strcat (in_name, "_base.");
strcat (in_name, image_in);
fpt = fopen(in_name, "rb");
expand(fpt, image, &sizex, &sizey);
fclose(fpt);
ecc_display(&images, 0);
while (layer_num < 1500)
{
    temp_short = layer_num;
    swap_short(&temp_short);
    fwrite(&temp_short, sizeof(short int), 1, base);
    layer_num = layer_num + layer_thick;
    hatch(&images, 0, base, 255, scalex, scaley, mirror, 1, 1);
    temp_short = 0;
    fwrite(&temp_short, 1, 1, base);
}
```

```c
printf("\nStart sweep at layer: %d\n", layer_num);
itoa(2, image_in);
in_name[0] = 0;
strcat (in_name, base_name);
strcat (in_name, "_base.");
strcat (in_name, image_in);
fpt = fopen(in_name, "rb");
expand(fpt, image, &sizex, &sizey);
fclose(fpt);
ecc_display(&images, 0);
temp_short = layer_num;
swap_short(&temp_short);
fwrite(&temp_short, sizeof(short int), 1, base);
layer_num = layer_num + layer_thick;
hatch(&images, 0, base, 255, scalex, scaley, mirror, 1, 1);
temp_short = 0;
fwrite(&temp_short, 1, 1, base);
itoa(3, image_in);
in_name[0] = 0;
strcat (in_name, base_name);
strcat (in_name, "_base.");
strcat (in_name, image_in);
fpt = fopen(in_name, "rb");
expand(fpt, image, &sizex, &sizey);
fclose(fpt);
ecc_display(&images, 0);
while (layer_num < 2000)
{
    temp_short = layer_num;
    swap_short(&temp_short);
    fwrite(&temp_short, sizeof(short int), 1, base);
    layer_num = layer_num + layer_thick;
    hatch(&images, 0, base, 255, scalex, scaley, mirror, 1, 1);
    temp_short = 0;
    if (layer_num < 2000) fwrite(&temp_short, 1, 1, base);
}
fclose(base);
ecc_copy_image(&images, 0, &images, 1, 1);

for (i = first; i <= last; i++)
{
    itoa(i, image_in);
    in_name[0] = 0;
    strcat (in_name, base_name);
    strcat (in_name, "_wb.");
    strcat (in_name, image_in);
    fpt = fopen(in_name, "rb");
    expand(fpt, image, &sizex, &sizey);
    fclose(fpt);
    if (i == first) ecc_or(&images, 0, &images, 1, &images, 0);
    ecc_display(&images, 0);
    temp_short = layer_num;
    swap_short(&temp_short);
    fwrite(&temp_short, sizeof(short int), 1, fp);
    fwrite(&temp_short, sizeof(short int), 1, sup);
    layer_num = layer_num + layer_thick;
```

```
            printf("layer = %d\r", layer_num);
            hatch(&images, 0, fp, 255, scalex, scaley, mirror, hatch_x, hatch_y);
            hatch(&images, 0, sup, 254, scalex, scaley, mirror, 1, 1);
            if (trac) trace (&images, 0, 1, fp, scalex, scaley, mirror);
            temp_char = 0;
            if (i != last)
            {
                fwrite(&temp_char, sizeof(char), 1, fp);
                fwrite(&temp_char, sizeof(char), 1, sup);
            }
        }
}

/* the X and Y hatch routine */
hatch(images, im_num, fp, val, scalex, scaley, mirror, hatch_x, hatch_y)
struct ecc_images       *images;
int                     im_num;
FILE                    *fp;
int                     val;
float                   scalex, scaley;
char                    mirror;
int                     hatch_x, hatch_y;
{
    long int            cur_pos, last_pos, temp_long;
    long int            cur_pos_s, last_pos_s, count_s;
    short int           temp_short;
    unsigned short int  sizex, sizey;
    short int           startx, starty, endx, endy, count, ix, iy;
    long int            add, addy, error, point;
    unsigned char       *image;

fprintf(fp, "\002");
    cur_pos = ftell(fp);
    if (cur_pos == -1)
    {
        printf("ftell error\n");
        exit(-1);
    }
    temp_short = 0;
    fwrite(&temp_short, sizeof(short int), 1, fp);

/* get image into host memory */
    sizex = images->x_image_size;
    sizey = images->y_image_size;

image = (unsigned char*)ecc_find_image(images, im_num, &error);
    ecc_display(images, im_num);

count = 0;
    count_s = 0;
    for (iy = 0; iy < sizey; iy = iy + hatch_y)
    {
        addy = iy * sizex;
        startx = -1;
        endx = -1;
```

```
            temp_short = iy * scaley;
            swap_short(&temp_short);
            for (ix = 0; ix < sizex; ix++)
            {
                add = addy + ix;
                if ((image[add] == val) && (startx == -1))
                {
                    point = add;
                    startx = ix;
                }
                if ((image[add] != val) && (startx != -1)) endx = ix - 1;
                if ((startx != -1) && (endx != -1))
                {
                    if (startx != endx)
                    {
                        if (mirror) startx = (sizex - startx - 1) * scalex;
                        else startx = startx * scalex;
                        if (mirror) endx = (sizex - endx - 1) * scalex;
                        else endx = endx * scalex;
                        swap_short(&startx);
                        swap_short(&endx);
                        fwrite(&startx, sizeof(short int), 1, fp);
                        fwrite(&temp_short, sizeof(short int), 1, fp);
                        fwrite(&endx, sizeof(short int), 1, fp);
                        fwrite(&temp_short, sizeof(short int), 1, fp);
                        count = count + 4;
                    }
                    startx = -1;
                    endx = -1;
                }
            }
            if (startx != -1)
            {
                endx = sizex - 1;
                if (startx != endx)
                {
                    if (mirror) startx = (sizex - startx - 1) * scalex;
                    else startx = startx * scalex;
                    if (mirror) endx = (sizex - endx - 1) * scalex;
                    else endx = endx * scalex;
                    swap_short(&startx);
                    swap_short(&endx);
                    fwrite(&startx, sizeof(short int), 1, fp);
                    fwrite(&temp_short, sizeof(short int), 1, fp);
                    fwrite(&endx, sizeof(short int), 1, fp);
                    fwrite(&temp_short, sizeof(short int), 1, fp);
                    count = count + 4;
                }
            }
        }
        for (ix = 0; ix < sizex; ix = ix + hatch_x)
        {
            starty = -1;
            endy = -1;
            if (mirror) temp_short = (sizex - ix - 1) * scalex;
            else temp_short = ix * scalex;
```

```
        swap_short(&temp_short);
        for (iy = 0; iy < sizey; iy++)
        {
            add = iy * sizex + ix;
            if ((image[add] == val) && (starty == -1))
            {
                point = add;
                starty = iy;
            }
            if ((image[add] != val) && (starty != -1)) endy = iy - 1;
            if ((starty != -1) && (endy != -1))
            {
                if (starty != endy)
                {
                    starty = starty * scaley;
                    endy = endy * scaley;
                    swap_short(&starty);
                    swap_short(&endy);
                    fwrite(&temp_short, sizeof(short int), 1, fp);
                    fwrite(&starty, sizeof(short int), 1, fp);
                    fwrite(&temp_short, sizeof(short int), 1, fp);
                    fwrite(&endy, sizeof(short int), 1, fp);
                    count = count + 4;
                }
                starty = -1;
                endy = -1;
            }
        }
        if (starty != -1)
        {
            endy = sizey - 1;
            if (starty != endy)
            {
                starty = starty * scaley;
                endy = endy * scaley;
                swap_short(&starty);
                swap_short(&endy);
                fwrite(&temp_short, sizeof(short int), 1, fp);
                fwrite(&starty, sizeof(short int), 1, fp);
                fwrite(&temp_short, sizeof(short int), 1, fp);
                fwrite(&endy, sizeof(short int), 1, fp);
                count = count + 4;
            }
        }
    } last_pos = ftell(fp);
    fseek(fp, cur_pos, SEEK_SET);
    swap_short(&count);
    fwrite(&count, sizeof(short int), 1, fp);
    fseek(fp, last_pos, SEEK_SET);
} swap_short(val)
char            val[2];
```

```
{
    char        temp;

temp = val[0];
    val[0] = val[1];
    val[1] = temp;
    return(0);
} swap_long(val)
char        val[4];
{
    char        temp;

temp = val[0];
    val[0] = val[3];
    val[3] = temp;
    temp = val[1];
    val[1] = val[2];
    val[2] = temp;
    return(0);
} trace (images, in_num, out_num, fp, scalex, scaley, mirror)
struct ecc_images       *images;
int                     in_num, out_num;
FILE                    *fp;
float                   scalex, scaley;
char                    mirror;
{
    unsigned char           *image, *image_1;
    int                     sizex, sizey;
    register int            x, y, i;
    int                     j, count, dir;
    unsigned short int      ix, iy,temp_short;
    unsigned short int      *x_val, *y_val;
    unsigned long int       area, error;

sizex = images->x_image_size;
    sizey = images->y_image_size;

image = (unsigned char*)ecc_find_image(images, out_num, &error);
    image_1 = (unsigned char*)ecc_find_image(images, in_num, &error);

for (y = 0; y < sizey - 1; y++)
    {
        for (x = 1; x < sizex - 1; x++)
        {
            i = x + y * sizex;
            if (image_1[i] != 255) image_1[i] = 0;
        }
    } for (y = 1; y < sizey - 1; y++)
```

```
    {
        for (x = 1; x < sizex - 1; x++)
        {
            i = x + y * sizex;
            image[i] = 0;
            if (image_1[i] != 0)
            {
                if (image_1[i + 1] == 0) image[i] = 255;
                if (image_1[i - 1] == 0) image[i] = 255;
                if (image_1[i + sizex] == 0) image[i] = 255;
                if (image_1[i - sizex] == 0) image[i] = 255;
            }
        }
    }
    for (i = 0; i < sizex; i++)
    {
        image[i] = image_1[i];
        if (image[i] != 0) image[i] = 255;
        x = sizex * sizey - 1 - i;
        image[x] = image_1[x];
        if (image[i] != 0) image[i] = 255;
    }
    for (i = 0; i < sizey; i++)
    {
        x = i * sizex;
        image[x] = image_1[x];
        if (image[i] != 0) image[i] = 255;
        x = x + sizex - 1;
        image[x] = image_1[x];
        if (image[i] != 0) image[i] = 255;
    } ecc_display(images, out_num);

area = 0;
    for (i = 0; i < sizex * sizey; i++) if (image[i] == 255) area++;
    x_val = (unsigned short int*)malloc((area + 1) * sizeof(short int) * 2);
    y_val = (unsigned short int*)malloc((area + 1) * sizeof(short int) * 2);

count = 0;

i = find_start(image, sizex, sizey);
    if (i == -1) return(0);
    image[i] = 128;

do                                   /* trace until no 255 values */
    {
        if (image[i] != 0) dir = find_dir(image, i, sizex, sizey);
        else dir = -1;
/* write the vector block and the number of vector components in block */
        if ((dir == -1) && (count >= 2))
        {
            fprintf( fp,"\001");    /* 001 for the Layer Border vector block
            temp_short = count * 4 - 4;
            swap_short(&temp_short);
            fwrite(&temp_short, sizeof(short int), 1, fp);
```

```c
    for (j = 0; j < count; j++)
    {
        if (mirror) ix = (sizex - x_val[j] - 1) * scalex;
        else ix = x_val[j] * scalex;
        iy = y_val[j] * scaley;
        swap_short(&ix);
        swap_short(&iy);
        fwrite(&ix, sizeof(short int), 1, fp);
        fwrite(&iy, sizeof(short int), 1, fp);
        if ((j != 0) && (j != count - 1))
        {
            fwrite(&ix, sizeof(short int), 1, fp);
            fwrite(&iy, sizeof(short int), 1, fp);
        }
    }
    count = 0;
} while (dir == -1)
{
    i = find_start(image, sizex, sizey);
    if (i == -1) break;
    image[i] = 128;
    dir = find_dir(image, i, sizex, sizey);
}
if (i != -1)
{
    y = i / sizex;
    x = i - y * sizex;
    x_val[count] = x;
    y_val[count] = y;
    count++;
    switch (dir)
    {
        case 0:
            while ((x < sizex) && (image[i] != 0))
            {
                image[i] = 128;
                x++;
                i = x + y * sizex;
            }
            x--;
        break;

case 1:
            while ((x < sizex) && (y >= 0) && (image[i] != 0))
            {
                image[i] = 128;
                x++;
                y--;
                i = x + y * sizex;
            }
            x--;
            y++;
        break;
```

```
case 2:
    while ((y >= 0) && (image[i] != 0))
    {
        image[i] = 128;
        y--;
        i = x + y * sizex;
    }
    y++;
break;

case 3:
    while ((x >= 0) && (y >= 0) && (image[i] != 0))
    {
        image[i] = 128;
        x--;
        y--;
        i = x + y * sizex;
    }
    x++;
    y++;
break;

case 4:
    while ((x >= 0) && (image[i] != 0))
    {
        image[i] = 128;
        x--;
        i = x + y * sizex;
    }
    x++;
break;

case 5:
    while ((x >= 0) && (y < sizey) && (image[i] != 0))
    {
        image[i] = 128;
        x--;
        y++;
        i = x + y * sizex;
    }
    x++;
    y--;
break;

case 6:
    while ((y < sizey) && (image[i] != 0))
    {
        image[i] = 128;
        y++;
        i = x + y * sizex;
    }
    y--;
break;

case 7:
```

```
                            while ((x < sizex) && (y < sizey) && (image[i] != 0))
                            {
                                image[i] = 128;
                                x++;
                                y++;
                                i = x + y * sizex;
                            }
                            x--;
                            y--;
                        break;
                }
                i = x + y * sizex;
                x_val[count] = x;
                y_val[count] = y;
                count++;
            }
        } while (i != -1);

if (count > 1)
        {
            printf ("ERROR!  Last structure traced was not written to file.\n");
            printf ("Structure count = %d.\n", count);
            exit(-1);
        }

/* free up memory */
        free(x_val);
        free(y_val);
} int find_start(image, sizex, sizey)
unsigned char           *image;
int                     sizex, sizey;
{
        register int            i, c;

i = 0;
        c = sizex * sizey;
        while ((i < c) && (image[i] != 255)) i++;
        if (i == c) return(-1);
        else return(i);
} int find_dir(image, i, sizex, sizey)
unsigned char           *image;
int                     i, sizex, sizey;
{
        register int            x, y;

y = i / sizex;
        x = i - y * sizex;

if (x + 1 < sizex)
        {
            if (image[i + 1] == 255) return(0);
```

```
        if ((y + 1 < sizey) && (image[i + 1 + sizex] == 255)) return(7);
        if ((y - 1 >= 0)    && (image[i + 1 - sizex] == 255)) return(1);
    }
    if (x - 1 >= 0)
    {
        if (image[i - 1] == 255) return(4);
        if ((y + 1 < sizey) && (image[i - 1 + sizex] == 255)) return(5);
        if ((y - 1 >= 0) && (image[i - 1 - sizex] == 255)) return(3);
    }
    if ((y + 1 < sizey) && (image[i + sizex] == 255)) return(6);
    if ((y - 1 >= 0) && (image[i - sizex] == 255)) return(2);

return(-1);
} itoa(in, out)
int             in;
char            *out;
{
    sprintf(out, "%d", in);
}
```

```
#define TRUE    (1)
#define FALSE   (0)
#include <stdio.h>
#include <string.h>
#include <unistd.h>
#include <sys/file.h>
#include <malloc.h>
#include <math.h>
#include "ecc.h"

main()
{
        char                    file_name[133], base_name[133], in_name[133];
        char                    out_base_name[133], out_name[133], count_a[33];
        unsigned char           *image_2;
        unsigned long int       sizex,sizey,err, j, k, bigx, bigy;
        int                     first, last, i, count, spacing;
        char                    answer[133], temp_char;
        short int               temp_short;
        unsigned short int      lut[768];
        int                     fileid;
        int                     seg_type;
        unsigned long int       error;
        unsigned short int      tt_0[256];
        unsigned int            tt_1[256], tt_2[256];
        double                  fac_x, fac_y;
        float                   sf1, sf2;
        float                   fov_x, fov_y, thickness;
        FILE                    *fpt;

/* ECC stuff */
        struct ecc_file_header  file_hd;
        struct ecc_images       images_1, images_2;

/* Set the image names to use */
      printf ("Enter first orginal image number: ");
      scanf ("%d", &first);
      printf ("Enter last orginal image number: ");
      scanf ("%d", &last);
      printf ("Enter input base file name: ");
      scanf ("%s", base_name);
      out_base_name[0] = 0;
      strcat(out_base_name, base_name);
      strcat(out_base_name, "_b");
      printf ("Enter number of output frames for each input frame: ");
      scanf ("%d", &spacing);
      printf ("Enter segment type (1-255 = 1 level disc.): ");
      scanf ("%d", &seg_type);
      printf ("Enter field of view in X (mm): ");
      scanf ("%f", &fov_x);
      fov_x = fov_x / 25.4;
      printf ("Enter field of view in Y (mm): ");
      scanf ("%f", &fov_y);
      fov_y = fov_y / 25.4;
      printf ("Enter orginal slice thickness (mm): ");
      scanf ("%f", &thickness);
```

```c
thickness = thickness / 25.4;
printf ("Enter zoomed X and Y size: ");
scanf ("%d %d", &bigx, &bigy);

if (((last - first) * spacing + 25.0) * (thickness / spacing) > 9.00)
{
    printf ("You have asked for a object of %f inches in height.\n",
            (float)(((last - first) * spacing + 25.0) / spacing));
    printf ("You must reduce the size of the object to < 9 inches.\n");
    exit (-1);
} in_name[0] = 0;
strcat (in_name, base_name);
strcat (in_name, ".data");
fpt = fopen(in_name, "wb");
fwrite(&first, sizeof(int), 1, fpt);
fwrite(&last, sizeof(int), 1, fpt);
fwrite(&spacing, sizeof(int), 1, fpt);
fwrite(&fov_x, sizeof(float), 1, fpt);
fwrite(&fov_y, sizeof(float), 1, fpt);
fwrite(&thickness, sizeof(float), 1, fpt);
fclose(fpt);

sprintf(count_a, "%d", first);
in_name[0] = 0;
strcat (in_name, base_name);
strcat (in_name, ".");
strcat (in_name, count_a);
printf ("ECC init = %d\n", ecc_init(2));
fileid = ecc_read_raster_header(in_name, &file_hd, lut, &error);
if (fileid == -1)
{
    printf("Error reading file header, %s\n", in_name);
    exit(-1);
}
ecc_make_image_header(&file_hd, &images_1);
images_1.num_images = 1;
ecc_set_images(&images_1);
sizex = images_1.x_image_size;
sizey = images_1.y_image_size;
error = ecc_read_raster_image(fileid, &images_1, 0);
ecc_display(&images_1, 0, &err);
close(fileid);
printf (" X image size: %d\n", sizex);
printf (" Y image size: %d\n", sizey);
count = (first - 1) * spacing + 1;

ecc_make_image_header(&file_hd, &images_2);
images_2.num_images = 3;
images_2.x_image_size = bigx;
images_2.y_image_size = bigy;
ecc_set_images(&images_2);
image_2 = (unsigned char*)ecc_find_image(&images_2, 2, &error);

ecc_clear_image(&images_2, 0, 1, 0, 0);
```

```c
        fac_x = (double)bigx / (double)sizex;
        fac_y = (double)bigy / (double)sizey;
        if ((fac_x == 1.0) && (fac_y == 1.0))
            ecc_copy_image(&images_1, 0, &images_2, 0, 1);
        else
            ecc_zoom(&images_1, 0, &images_2, 0, 1, fac_x, fac_y, 0, 0);
        if ((seg_type > 0) && (seg_type < 256))
        {
            for (i = 0; i < seg_type; i++) tt_0[i] = 0;
            for (i = seg_type; i < 256; i++) tt_0[i] = 255;
            ecc_transform(&images_2, 0, &images_2, 2, &tt_0[0]);
            ecc_display(&images_2, 2);
        }

/* do the test routine */
    for (i = first; i < last; i++)
    {
        printf("\nInput image: %d, Output image %d", i, count);
        out_name[0] = 0;
        strcat (out_name, out_base_name);
        strcat (out_name, ".");
        sprintf(count_a, "%d", count);
        strcat (out_name, count_a);
        ecc_display(&images_2, 2);
        fpt = fopen(out_name, "wb");
        compress(image_2, fpt, bigx, bigy);
        count++;
        sprintf(count_a, "%d", i + 1);
        in_name[0] = 0;
        strcat (in_name, base_name);
        strcat (in_name, ".");
        strcat (in_name, count_a);
        fileid = ecc_read_raster_header(in_name, &file_hd, lut, &error);
        if (fileid == -1)
        {
            printf("Error reading file header, file name = %s\n", in_name);
            exit(-1);
        }
        error = ecc_read_raster_image(fileid, &images_1, 0);
        if (error != 0)
        {
            printf("Error reading file %s\n", in_name);
            exit(-1);
        }
        close(fileid);
        ecc_clear_image(&images_2, 1, 1, 0, 0);
        if ((fac_x == 1.0) && (fac_y == 1.0))
            ecc_copy_image(&images_1, 0, &images_2, 1, 1);
        else
            ecc_zoom(&images_1, 0, &images_2, 1, 1, fac_x, fac_y, 0, 0);
        if (spacing != 1)
        {
            for (j = 1; j < spacing; j++)
            {
                printf(", %d", count);
                sf2 = (float)j / (float)spacing;
```

```
                    sf1 = 1.0 - sf2;
                    ecc_combine(&images_2, 0, sf1, &images_2, 1, sf2, &images_2, 2);
                    if ((seg_type > 0) && (seg_type <= 255))
                        ecc_transform(&images_2, 2, &images_2, 2, tt_0);
                    ecc_display(&images_2, 2);
                    out_name[0] = 0;
                    strcat (out_name, out_base_name);
                    strcat (out_name, ".");
                    sprintf(count_a, "%d", count);
                    strcat (out_name, count_a);
                    ecc_display(&images_2, 2);
                    fpt = fopen(out_name, "wb");
                    compress(image_2, fpt, bigx, bigy);
                    count++;
                }
            }
            else
            {
                if ((seg_type > 0) && (seg_type <= 255))
                    ecc_transform(&images_2, 1, &images_2, 2, tt_0);
            }
            ecc_copy_image(&images_2, 1, &images_2, 0, 1);
    }
    out_name[0] = 0;
    strcat (out_name, out_base_name);
    strcat (out_name, ".");
    sprintf(count_a, "%d", count);
    strcat (out_name, count_a);
    ecc_display(&images_2, 2);
    fpt = fopen(out_name, "wb");
    compress(image_2, fpt, bigx, bigy);
    printf("\nInput image: %d, Output image %d\n", i, count);
}
```

```c
#include <stdio.h>
#include <sys/file.h>
#include <malloc.h>
include <string.h> struct ras
{
    unsigned long int   magic;          /* SUN raster magic         */
    unsigned long int   x_size;         /* size of image in X       */
    unsigned long int   y_size;         /* size of image in Y       */
    unsigned long int   image_bits;     /* bits per pixel           */
    unsigned long int   length;         /* file length              */
    unsigned long int   type;           /* file type (must be 1)    */
    unsigned long int   map_type;       /* type of LUT              */
    unsigned long int   map_len;        /* length of LUT            */
    unsigned char       lut[768];       /* look up table            */
};

compress (in_buf, fpt, xsize, ysize)
unsigned char                   *in_buf;
FILE                            *fpt;
unsigned long int               xsize, ysize;
{
    unsigned short int  len;
    unsigned long int   count, i;
    unsigned char       val;

fwrite("W-G_BIN", 1, 8, fpt);
    fwrite(&xsize, sizeof(long int), 1, fpt);
    fwrite(&ysize, sizeof(long int), 1, fpt);

count = xsize * ysize;

val = in_buf[0];
    len = 1;
    for (i = 1; i < count; i++)
    {
        if (in_buf[i] == val) len++;
        if ((in_buf[i] != val) || (len == 65535))
        {
            fwrite(&len, sizeof(short int), 1, fpt);
            fwrite(&val, sizeof(char), 1, fpt);
            if (val == in_buf[i]) len = 0;
            else len = 1;
            val = in_buf[i];
        }
    }
    fwrite(&len, sizeof(short int), 1, fpt);
    fwrite(&val, sizeof(char), 1, fpt);
    fclose(fpt);
} expand(fpt, out_buf, xsize, ysize)
```

```
FILE                *fpt;
unsigned char       *out_buf;
unsigned long int                   *xsize, *ysize;
{
    char                tst[8];
    unsigned short int  len;
    unsigned char       val;
    unsigned long int   count, count_1;

fread(tst, sizeof(char), 8, fpt);
    if (strcmp(tst, "W-G_BIN") != 0)
    {
        fprintf(stderr, "Not a Wenner-Gren binary file\n");
        exit(-1);
    } fread(xsize, sizeof(long int), 1, fpt);
    fread(ysize, sizeof(long int), 1, fpt);
    count = *xsize * *ysize;
    count_1 = 0;
    while (count_1 < count)
    {
        fread(&len, sizeof(short int), 1, fpt);
        fread(&val, sizeof(char) , 1, fpt);
        memset(&out_buf[count_1], val, len);
        count_1 = count_1 + len;
    }
}
```

What is claimed is:

1. A method of converting a series of serial section images of an object into a physical three-dimensional model, comprising the steps of:

(a) acquiring and storing the series of serial section images;

(b) converting the series of serial section images into a predetermined format;

(c) zooming the converted series of serial section images;

(d) interpolating additional serial section images between each of the zoomed series of serial section images;

(e) discriminating the interpolated series of serial section images by retaining all pixels of each of the interpolated series of serial section images greater than or equal to a predetermined threshold, to produce a discriminated series of serial section images which make up a binary image;

(f) compressing the binary image to produce a compressed series of serial section images which make up a compressed binary image;

(g) filtering the compressed series of serial section images of the compressed binary image and generating support data for unsupported or floating contiguous pixel groups, said step (g) including the sub-steps of (g)(1) smoothing a first image and a second image of the compressed series of serial section images using a filter, (g)(2) identifying and storing contiguous pixel groups in the first image and the second image of the compressed series of serial section images having greater than a predetermined number of pixels, (g)(3) removing the stored contiguous pixel groups in the first image which are supported by contiguous pixel groups in the second image to produce unsupported or floating contiguous pixel groups in the first image, (g)(4) finding a center of the unsupported or floating contiguous pixel groups in the first image, (g)(5) adding a contiguous support pixel group in the second image to support the unsupported or floating contiguous pixel groups in the first image, and (g)(6) repeating sub-steps (g)(1)–(g)(6) for each sequential pair of images of the compressed series of serial section images to produce the support data;

(h) generating base data for the object;

(i) translating the filtered binary image to produce a plurality of vectors representing pixels of the object; and (j) producing the physical three-dimensional model of the object from the plurality of vectors representing pixels of the object.

2. The method of claim 1, wherein the series of serial section images are computer-aided tomography (CT) scans.

3. The method of claim 1, wherein the series of serial section images are magnetic resonance (MRI) images.

4. The method of claim 1, wherein the series of serial section image are video images.

5. The method of claim 4, wherein the video images are one of microtome and cryromicrotome images.

6. The method of claim 4, wherein the video images are ultra sound images.

7. The method of claim 1, wherein step (j) is performed by a stereolithography apparatus (SLA).

8. The method of claim 1, wherein step (d) interpolates the additional serial section images using a linear interpolation function.

9. The method of claim 1, wherein step (g) further includes median filtering the compressed binary image in order to smooth image edges of the object.

10. The method of claim 1, wherein said step (j), the physical three-dimensional model of the object is produced from the plurality of vectors representing pixels of the object, the support data, and the base data.

11. The method of claim 10, wherein the base data generated in step (k) includes bottom base data, middle base data, and top base data.

12. The method of claim 1, wherein the series of serial section images are one of computer-aided tomography (CT) scans, magnetic resonance imaging (MRI) images, microtome images, cryromicrotome images, and ultrasound images.

13. An apparatus for converting a series of serial section images of an object into a physical three-dimensional model, comprising:

means for acquiring and storing the series of serial section images;

means for converting the series of serial section images into a predetermined format;

means for zooming the converted series of serial section images;

means for interpolating additional serial section images between each of the zoomed series of serial section images;

means for discriminating the interpolated series of serial section images by retaining all pixels of each of the interpolated series of serial section images greater than or equal to a predetermined threshold, to produce a discriminated series of serial section images which make up a binary image;

means for compressing the binary image to produce a compressed series of serial section images which make up a compressed binary image;

means for filtering the compressed series of serial section images of the compressed binary image and for generating support data for unsupported or floating contiguous pixel groups, said means for filtering and generating support data including, means for smoothing a first image and a second image of the compressed series of serial section images using a filter, means for identifying and storing contiguous pixel groups in the first image and the second image of the compressed series of serial section images having greater than a predetermined number of pixels, means for removing the stored contiguous pixel groups in the first image which are supported by contiguous pixel groups in the second image to produce unsupported or floating contiguous pixel groups in the first image, means for finding a center of the unsupported or floating contiguous pixel groups in the first image, and means for adding a contiguous support pixel group in the second image to support the unsupported or floating contiguous pixel groups in the first image, wherein said means for filtering and generating support data operates on each sequential pair of images of the compressed series of serial section images to produce the support data;

means for generating base data for the object;

means for translating the filtered binary image to produce a plurality of vectors representing pixels of the object; and means for producing the physical three-dimensional model of the object from the plurality of vectors representing pixels of the object.

14. The apparatus of claim 13, wherein said means for producing produces the physical three-dimensional model of the object from the plurality of vectors representing pixels of the object, the support data, and the base data.

15. The apparatus of claim 13, wherein the series of serial section images are one of computer-aided tomography (CT) scans, magnetic resonance imaging (MRI) images, microtome images, cryromicrotome images, and ultrasound images.

* * * * *